United States Patent [19]

Weinraub

[11] Patent Number: 5,561,691
[45] Date of Patent: Oct. 1, 1996

[54] APPARATUS AND METHOD FOR DATA COMMUNICATION BETWEEN TWO ASYNCHRONOUS BUSES

[75] Inventor: Chananiel Weinraub, Tel Aviv, Israel

[73] Assignee: Scitex Corporation Ltd., Herzliya, Israel

[21] Appl. No.: 273,864

[22] Filed: Jul. 12, 1994

[30] Foreign Application Priority Data

Jul. 15, 1993 [IL] Israel ............................................ 106363

[51] Int. Cl.$^6$ ...................................................... H04L 7/00
[52] U.S. Cl. ............................... 375/355; 375/377; 370/91
[58] Field of Search ........................... 375/354, 355, 375/356, 370, 377; 370/91, 84, 85.1, 85.9, 85.13, 100.1; 348/500; 327/141, 144, 145

[56] References Cited

U.S. PATENT DOCUMENTS

| | | | |
|---|---|---|---|
| 4,446,555 | 5/1984 | Devault et al. | 370/94 |
| 4,771,441 | 9/1988 | Spengler et al. | 375/354 |
| 4,873,703 | 10/1989 | Crandall et al. | 375/354 |
| 4,881,165 | 11/1989 | Sager et al. | 364/200 |
| 5,047,658 | 9/1991 | Shrock et al. | 307/269 |
| 5,097,489 | 3/1992 | Tucci | 375/120 |
| 5,446,764 | 8/1995 | Kondo | 375/354 |

*Primary Examiner*—Stephen Chin
*Assistant Examiner*—Don Vo
*Attorney, Agent, or Firm*—Ladas & Parry

[57] ABSTRACT

This disclosure describes an apparatus for data communication from a first data bus having a first clock frequency to a second data bus having a second clock frequency, asynchronous to the first frequency. The apparatus includes a synchronizer operative to sample data on said first data bus at a selected sampling rate and to provide such data to said second data bus at selected sampling rate.

12 Claims, 22 Drawing Sheets

1

APPARATUS AND METHOD FOR DATA COMMUNICATION BETWEEN TWO ASYNCHRONOUS BUSES

FIELD OF THE INVENTION

The present invention relates to apparatus and methods for data communication between busses.

BACKGROUND OF THE INVENTION

U.S. Pat. No. 4,881,165 to Ramanujan et al describes a system for high speed data transmission between two systems operating under the same clock with unknown and nonconstant skew in the clock between the two systems.

U.S. Pat. No. 4,873,703 to Cavanna et al describes a synchronizing system for reliably passing data across a boundary between two independent, non-correlated clocks.

U.S. Pat. No. 5,097,489 to Tucci describes a method and structure for performing data synchronization by delaying the input data for one-half of the VCO signal period and then comparing the phase of the delayed input data to the VCO signal.

U.S. Pat. No. 5,047,658 to Petty et al describes a data synchronizer which uses a positive feedback self latching gate as the first memory element rather than a cross-coupled device such as a flip-flop.

None of these patents appear to disclose a simple system for synchronizing transfer of data between busses whose width is two or more bits.

SUMMARY OF THE INVENTION

The present invention seeks to provide an improved structure providing data communication between data busses.

The term "data busses" is intended to refer to busses of any width on which flows any type of information including, for example, addresses.

There is thus provided in accordance with a preferred embodiment of the present invention apparatus for data communication from a first data bus having a first clock frequency to a second data bus having a second clock frequency, asynchronous to the first clock frequency, the apparatus including a synchronizer operative to sample data on the first data bus at a selected sampling rate and to provide such data to the second data bus at the selected sampling rate.

Further in accordance with a preferred embodiment of the present invention the synchronizer is operative to provide such data to the second data bus without a handshake.

Additionally in accordance with a preferred embodiment of the present invention the data includes memory addresses.

Also in accordance with a preferred embodiment of the present invention the second data bus is operative to accept the data provided by the synchronizer at the second clock frequency.

Still further in accordance with a preferred embodiment of the present invention the synchronizer includes a time window generator operative to define a time window for sampling the first data bus and receiving a clock input from the second data bus, at least one input clock synchronizer receiving a window defining output from the time window generator and a clock input from the first data bus and providing a latch enable signal, a bus latch and sampler operative to receive a data input from the first data bus and a clock input from the second data bus and being operative to sample the data input from the first data bus in response to receipt of the latch enable signal, the bus latch and sampler being operative to provide the sampled data input from the first data bus to the second data bus at a time determined by the clock input from the second data bus.

Yet further in accordance with a preferred embodiment of the present invention the bus latch and sampler includes at least one single stage memory for storing the sampled data input.

Additionally in accordance with a preferred embodiment of the present invention the at least one single stage memory includes at least one latch array receiving the data input from the first data bus and the latch enable signal and being operative to sample the data input in response to the latch enable signal and at a time determined thereby, and a sampler receiving the sampled data input, sampled by the latch array and being operative to output the data to the second data bus at a time determined by the second clock signal and by the window defining output.

Further in accordance with a preferred embodiment of the present invention the sampler is operative to output the data at a time following sampling by the latch array within a given window.

Yet further in accordance with a preferred embodiment of the present invention the sampler includes an array of flip-flops corresponding in number to the width of the narrower of the two busses.

Also in accordance with a preferred embodiment of the present invention the latch array includes a plurality of latches corresponding in number to the width of the narrower of the two busses.

Still further in accordance with a preferred embodiment of the present invention the synchronizer includes at least one input clock synchronizer receiving clock input from the first data bus and providing a latch enable signal, a bus latch and sampler operative to receive a data input from the first data bus and a clock input from the second data bus and being operative to sample the data input from the first data bus in response to receipt of the latch enable signal, the bus latch and sampler being operative to provide the sampled data input from the first data bus to the second data bus at a time determined by the clock input from the second data bus.

Additionally in accordance with a preferred embodiment of the present invention the at least one input clock synchronizer includes two input clock synchronizers and the at least one latch array includes two latch arrays and also including a multiplexer for selecting from among the two latches, the latch which most recently sampled the first bus.

Also in accordance with a preferred embodiment of the present invention the bus latch and sampler is operative to sample the data input from the first data bus and to provide an output thereof to the second data bus twice during each window.

Further in accordance with a preferred embodiment of the present invention, the first and second busses have first and second protocols respectively, the apparatus also including a direct memory access controller including a cyclic FIFO having at each individual time a current write address and a current read address, a write controller operative to write data from the first bus onto the cyclic FIFO according to the first clock and the first protocol and according to an indication of the current read address received from the synchronizer and a read controller operative to read data from the cyclic FIFO onto the second bus according to the second clock and the second protocol and according to an indication of the current write address received from an additional synchronizer.

Also provided, in accordance with another preferred embodiment of the present invention, is a method for data communication from a first data bus having a first clock frequency to a second data bus having a second clock frequency, asynchronous to said first clock frequency, the method comprising the step of sampling data on the first data bus at a selected sampling rate and providing such data to the second data bus at the selected sampling rate.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
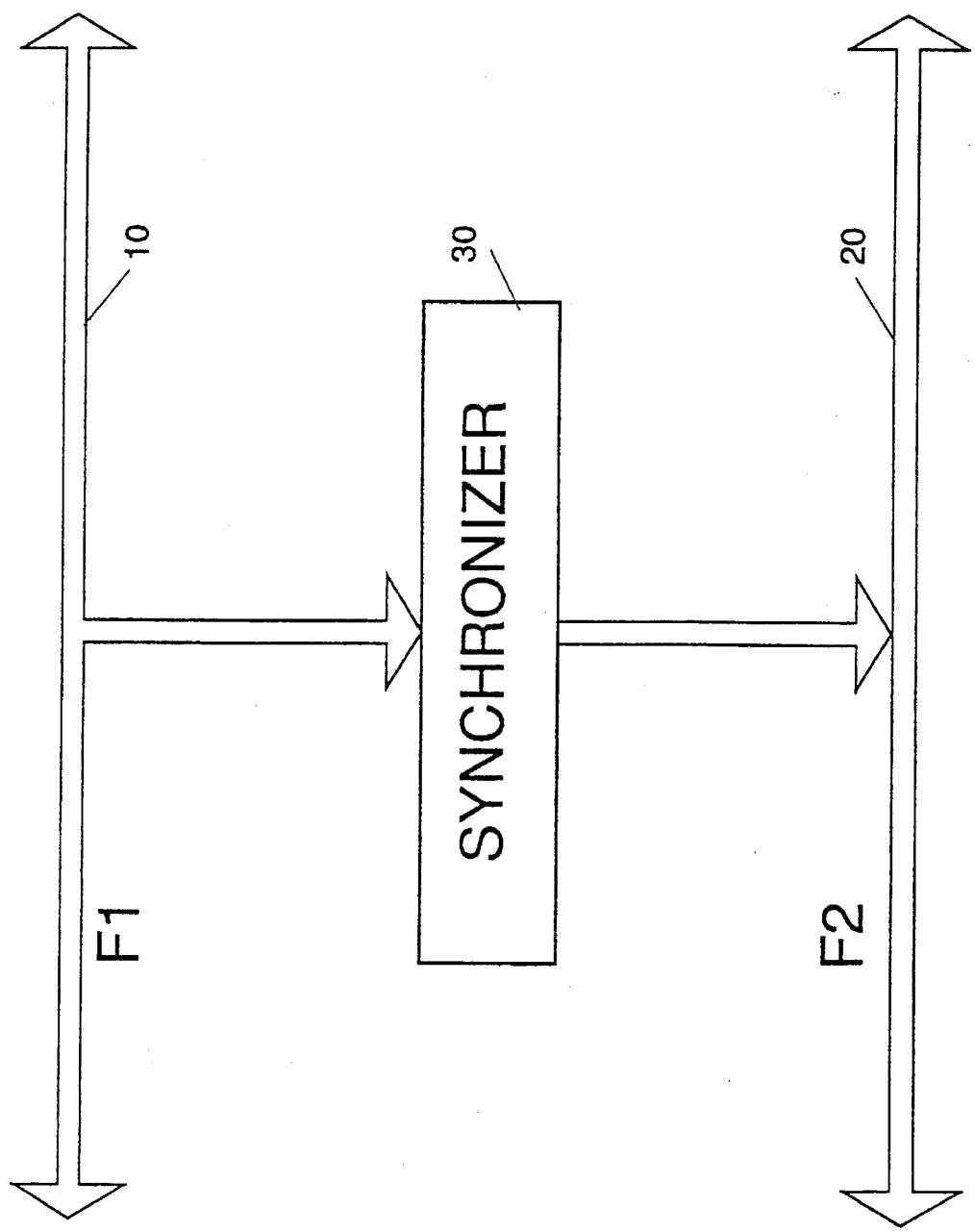
FIG. 1 is a simplified block diagram of data communication apparatus which is constructed and operative in accordance with a preferred embodiment of the present invention.

Reference is now made to FIG. 1 which is a simplified block diagram of data communication apparatus which is constructed and operative in accordance with a preferred embodiment of the present invention. The apparatus transfers data from a first data bus 10 having a first clock frequency F1 and a first clock period T1 to a second data bus 20 having a second clock frequency F2, asynchronous to said first clock frequency, and a second clock period T2.

The data communication apparatus of FIG. 1 includes a synchronizer 30 operative to sample data on first data bus 10 at a selected sampling rate R and to provide such data to said second data bus at said selected sampling rate. The sampling rate is typically a function of a time window during which the first bus is sampled, as explained in detail below.

In the present specification, for simplicity, the invention is described for the instance in which the busses and 20 are synchronous to the rising edges of F1 and F2 respectively. However, it is appreciated that, alternatively, buses 10 and 20 may be synchronous to the falling edges of F1 and F2 respectively.

Figure 2:
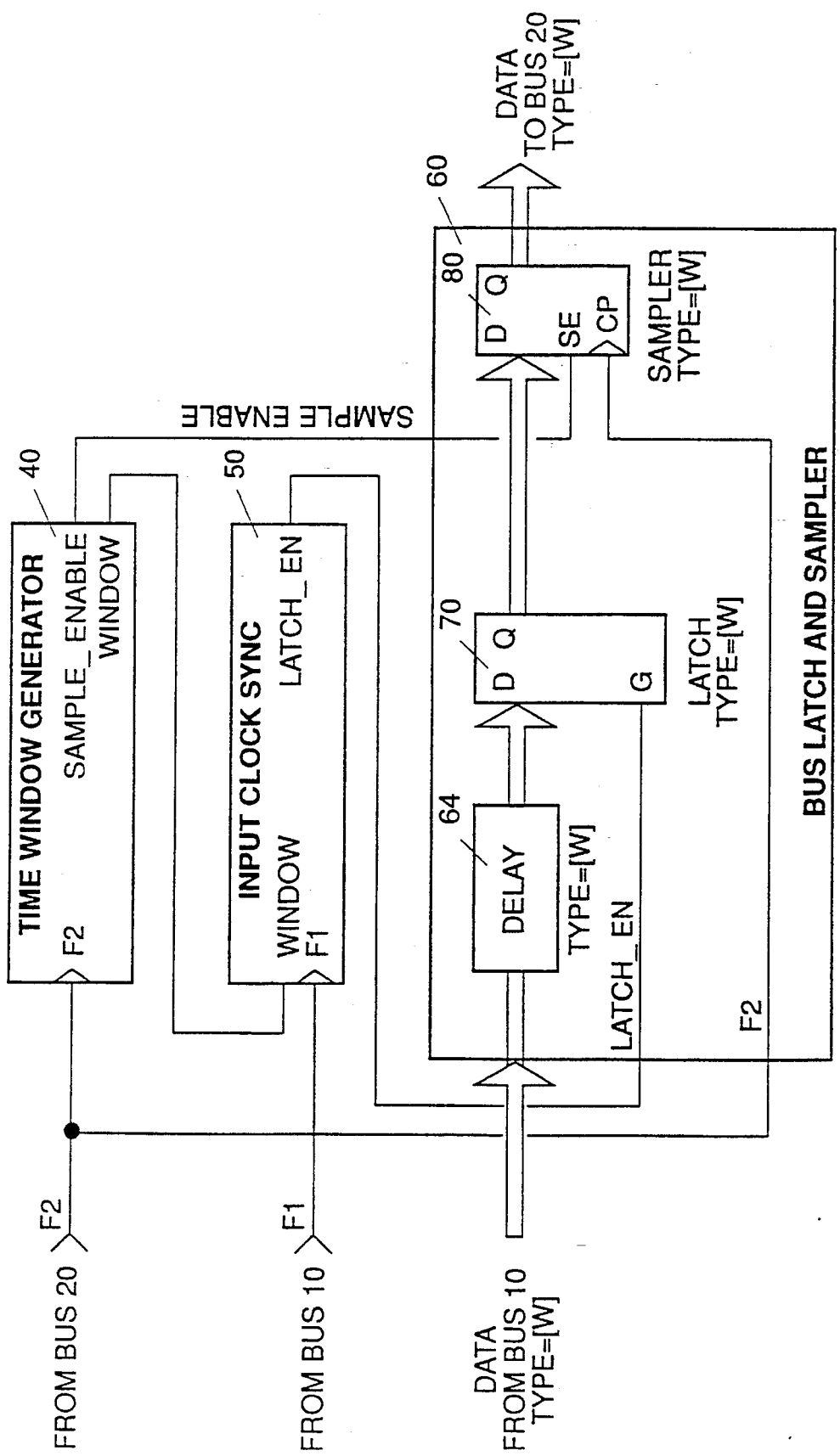
FIG. 2 is a simplified block diagram of synchronizer 30 of FIG. 1.

FIG. 2 is a simplified block diagram of synchronizer 30 of FIG. 1. The synchronizer 30 typically comprises the following elements:

a. a time window generator 40 operative to define a time window for sampling the first data bus 10 according to the clock frequency F2 of the second data bus 20;

b. be at least one of input clock synchronizer arrays 50 receiving:

a window defining output from the time window generator 40; and the input clock, i.e. the clock frequency F1 from the first data bus 10.

The input clock synchronizer array 50 is operative to provide a latch enable signal.

c. a bus latch and sampler 60 which includes:

i. an array of delay units 64, corresponding in number to the width W of the bus 20, as indicated by the notation "TYPE=[W]", is sometimes provided. The delay units 64 ensure that the data arriving from bus 10 is latched by latch 70 in a steady state.

ii. an array of latches 70, corresponding in number to the width W of the bus 20, as indicated by the notation "TYPE=[W]". Each latch 70 is operative to sample the first data bus 10 in response to a falling edge of the latch enable signal from the input clock synchronizer 50; and iii. an array of samplers 80, corresponding in number to the width W of the bus 20, as indicated by the notation "TYPE=[W]". Each sampler 80 is operative to transfer the data sampled from the first data bus by the corresponding latch 70 to the second data bus 20 at a time determined by clock input F2. In the illustrated example, each sampler 80 comprises a scan flip-flop.

It is appreciated that, equally, the latch 70 may close in response to a rising edge of the latch enable signal, however, the present invention, for simplicity, is described under the assumption that the falling edge of the latch enable signal closes the latch 70.

Except in cases where sampler 80 comprises a conventional flip-flop which samples on the rising edge of F2 and the period or width of the window signal is T2 or 2×T2, the time window generator 40 is operative to generate a predetermined sampler enable signal and the sampler enable signal enables the sampler 80.

Typically, the sampler enable signal generated by the time window generator 40 is of the following form: the signal is in its enabling state from when the latch 70 closes until the end of the time window. The signal is generated at the F2 rising edge which precedes the F2 rising edge which lowers the window signal.

Figure 3:
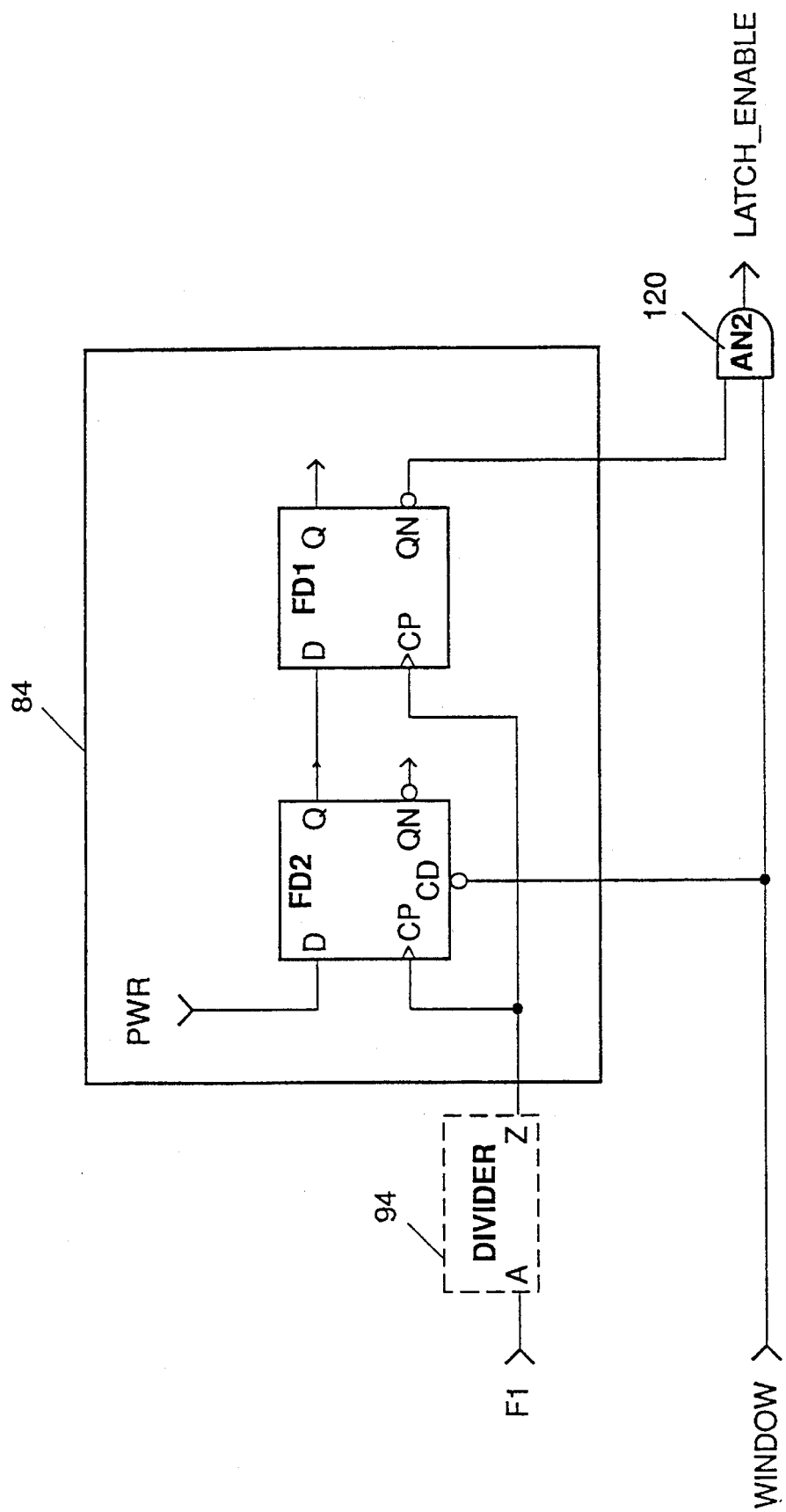
FIGS. 3–5 are detailed schematic illustrations of the input clock synchronizer of FIG. 2 constructed according to three respective alternative embodiments of the present invention.
Figure 4:
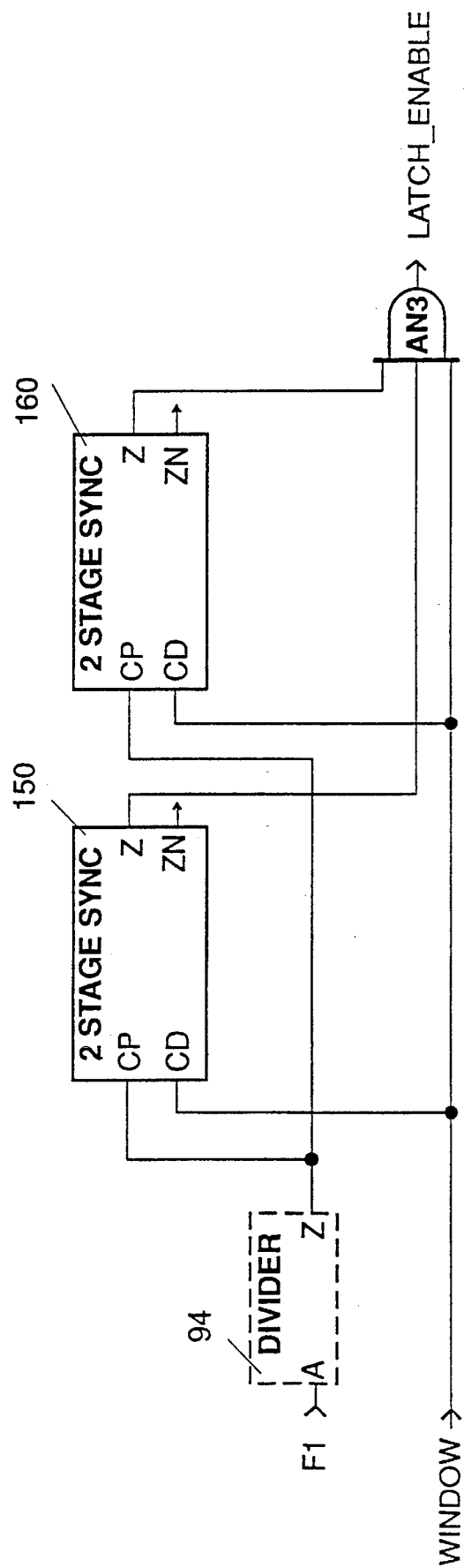
Figure 5:
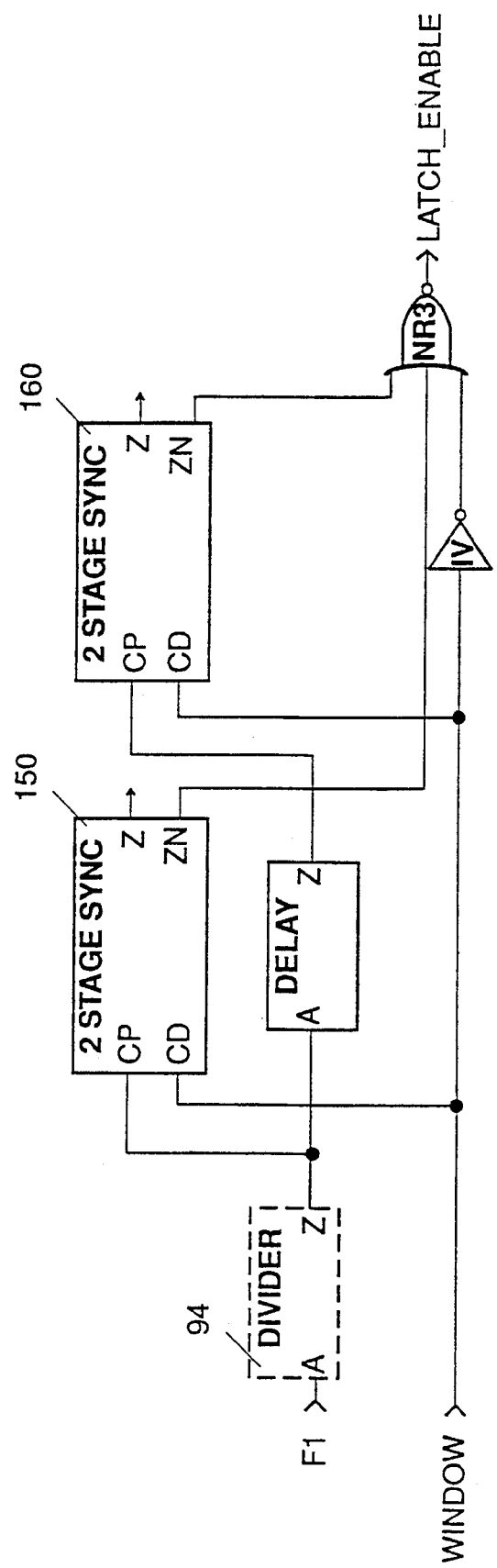

Reference is now made to FIGS. 3–5 which illustrate input clock synchronizers 50 constructed according to three respective alternative embodiments of the present invention. As shown, the input clock synchronizers 50 in each of FIGS. 3–5 each include an optional divider 94, at least one two-stage synchronizer and an AND gate or a NOR gate.

The architecture of input clock synchronizer 50 in any of FIGS. 3–5 may be designed as follows:

a. Use the flowchart of FIG. 6 to determine whether the input clock synchronizer 50 is to include a divider or not and to determine whether the trigger time difference of the one or more two-stage synchronizers in input clock synchronizer 50 is to be T1 or T½.

Figure 6:
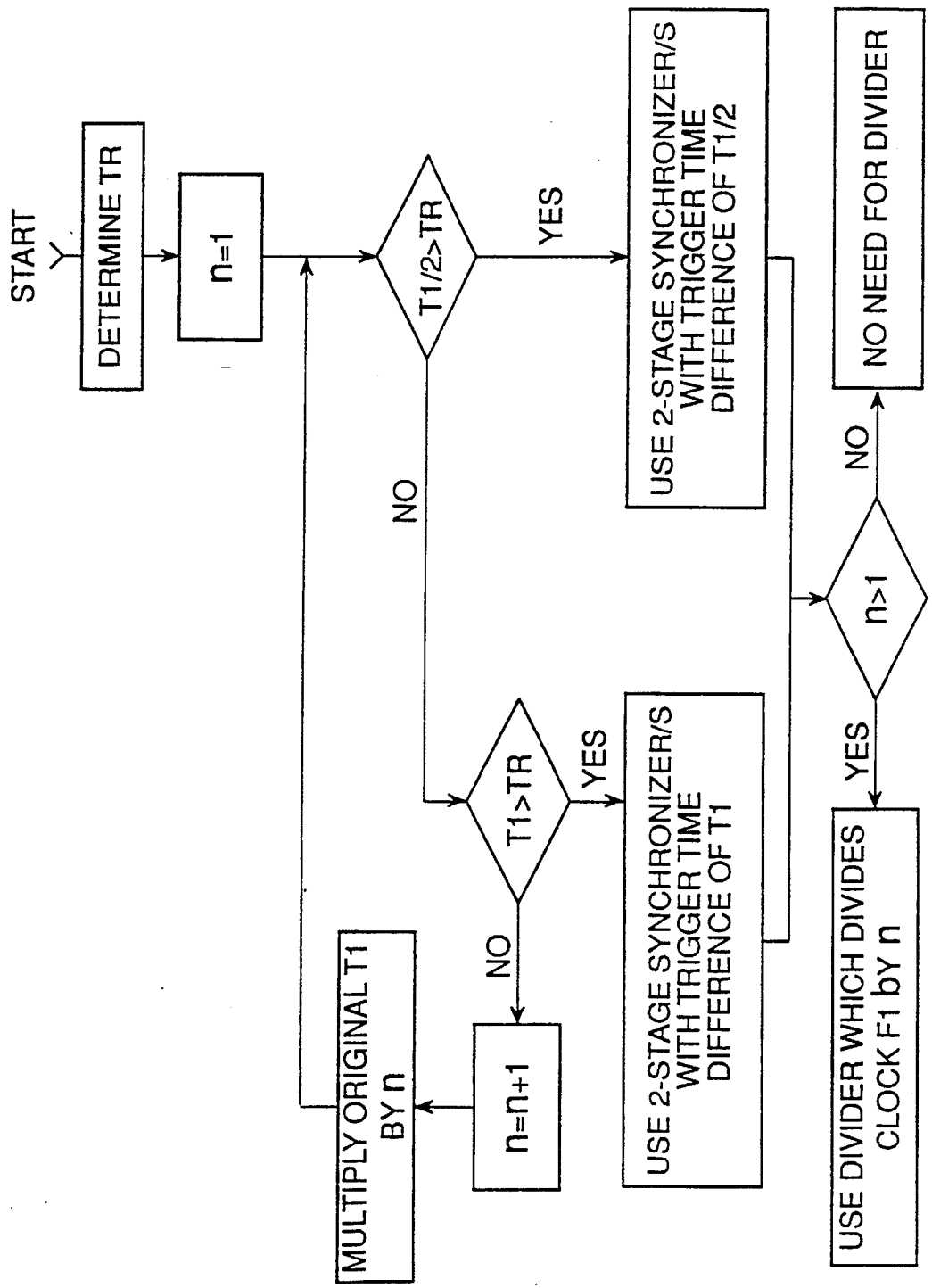
FIG. 6 is a simplified flowchart illustration of considerations in designing an input clock synchronizer.

In FIG. 6, the parameter TR is defined as the probable time it takes for the flip-flop to escape from its metastable state and settle down in a legal binary state (zero or one), so that the MTBF (Mean Time Between Failures, by which the metastability performance of a flip-flop is normally evaluated) is very large.

According to the experimental studies of the metastability behavior of LSI-LOGIC flip-flops, MTBF is defined as:

$MTBF=1/(2*Fc*Fd*A1E-9*exp(-B*(TR-Tp)))$ [sec]

where A, B are parameters given by the manufacturer of the flip-flop and defined as:

A=Metastability Constant of the specified flip-flop, [ns]

B=Gain Bandwidth of the specified flip-flop, [1/ns]

The remaining parameters are defined as:

Tp=Total propogational delay of the flip-flop, [ns]

Fc=Input clock frequency, [Hz]

Fd=Input data frequency, [Hz]

For example, for LSI-LOGIC LCA100K technology, for FDI flip-flop, at the worst conditions, namely 4.75 V, 70° C., the parameters A and B are given by: 5.5E-8 [ns] and 5.41 [1/ns], respectively.

The value of TR used in the examples given hereinbelow, for a value of MTBF>>1×10$^6$ years, is 30 nanoseconds.

If a range of frequencies is defined for F1, rather than a single value, then T1, for the purpose of this computation, is selected to be the inverse of the "worst case" F1, i.e. the inverse of the maximum F1 within the range.

b. If the embodiment of FIG. 3 is employed, select the two-stage synchronizer 84 from the two-stage synchronizers of FIGS. 7A–7D, if the trigger time difference of two-stage synchronizer 84 is T1. If the trigger time difference of two-stage synchronizer 84 is T½, select the two-stage synchronizer 84 from the two-stage synchronizers of FIGS. 8A–8D.

c. If the embodiments of FIGS. 4 or 5 are employed, select the two-stage synchronizer 150 from the two-stage synchronizers of FIGS. 7A–7D, if the trigger time difference of two-stage synchronizer 150 is T1. If the trigger time difference of two-stage synchronizer 150 is T½, select the two-stage synchronizer 84 from the two-stage synchronizers of FIGS. 8A–8D.

Figure 7A:
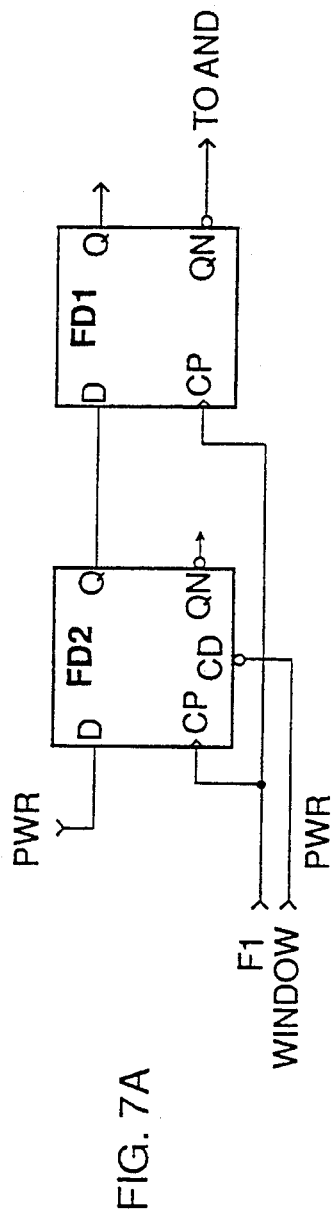
FIGS. 7A–7D are detailed schematic illustrations of four respective two-stage synchronizers having an operation time of 2×T1.
Figure 7B:
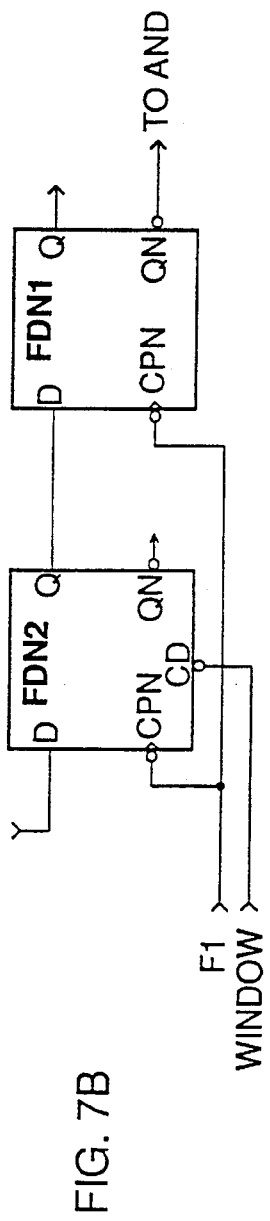
Figure 7C:
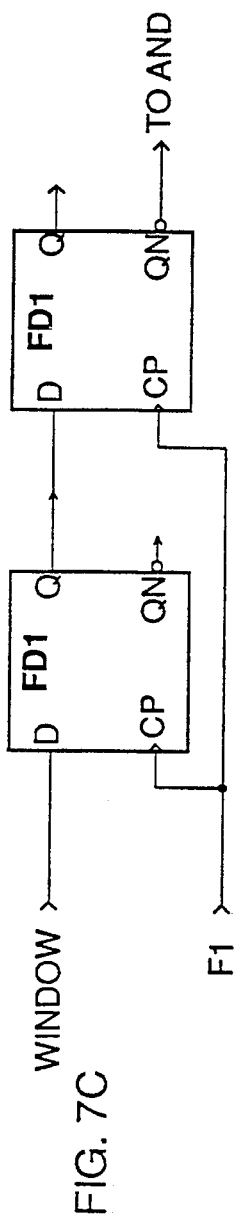
Figure 7D:
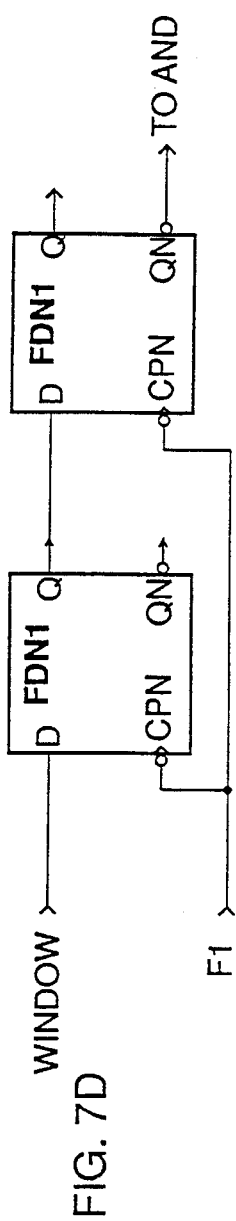
Figures 8A, 8B, 8C, 8D:
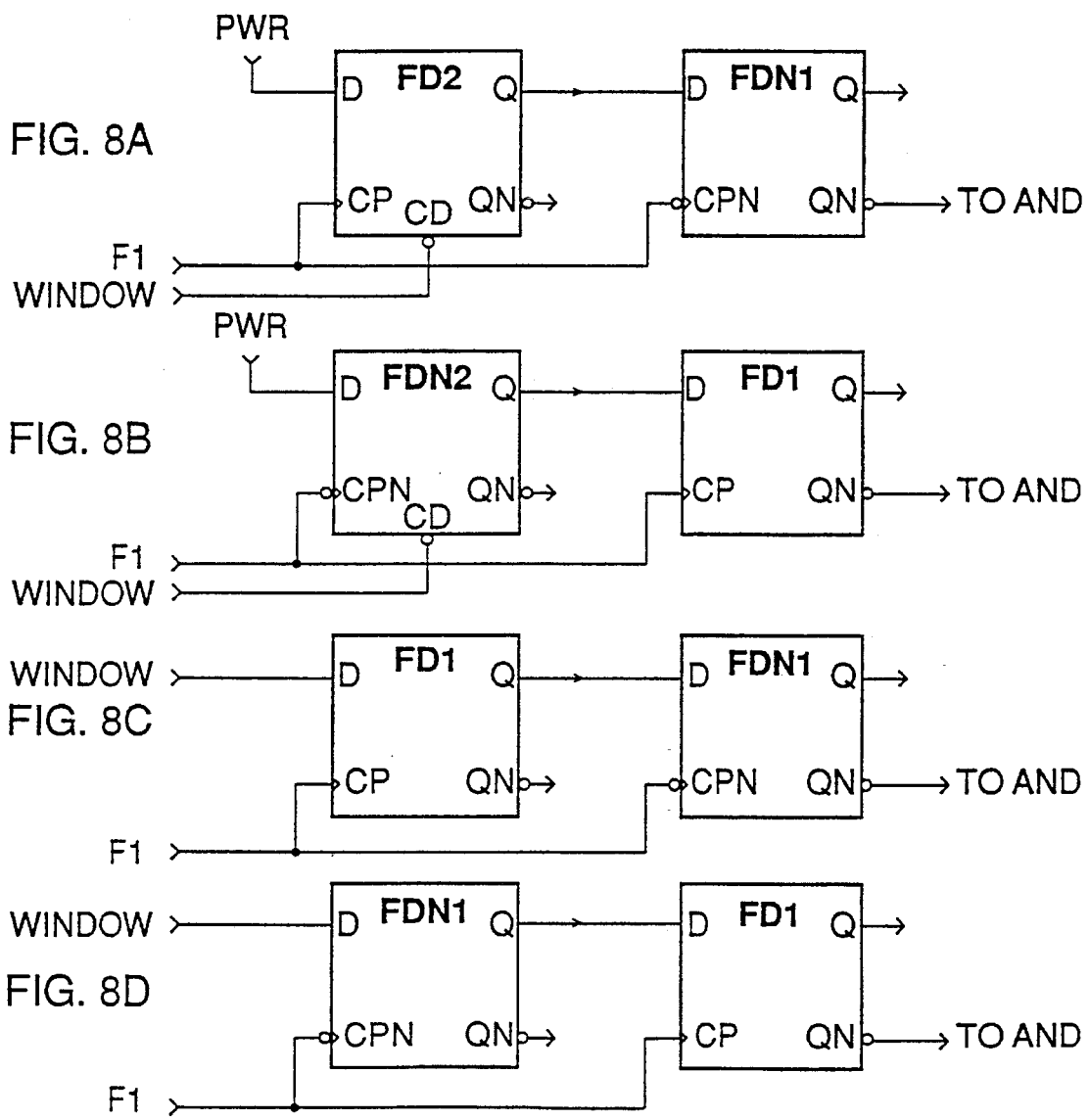
FIGS. 8A–8D are detailed schematic illustrations of four respective two-stage synchronizers having an operation time of T1.

Next, select two-stage synchronizer 160 as follows: For each possible two-stage synchronizer 150, selected from among the 8 possibilities of FIGS. 7A–8D, there are two possible two-stage synchronizers 160 from among FIGS. 7A–8D. Specifically, if two-stage synchronizer 150 comprises the apparatus of FIGS. 7A; 7B; 7C; 7D; 8A; 8B; 8C; and 8D, respectively, then the two possibilities for two-stage synchronizer 160 are respectively: FIGS. 7B or 7D; 7A or 7C; 7B or 7D; 7A or 7C; 8B or 8D; 8A or 8C; 8B or 8D; and 8A or 8C. For the embodiment of FIG. 5, two-stage synchronizers 150 and 160 may be identical.

It is appreciated that the embodiments of FIGS. 3–5 are merely exemplary and that many variations thereof are possible. For example, the AND gate may be replaced by a NOR gate with opposite inputs. Another sample variation is that more than two 2-stage synchronizers may be provided, instead of exactly two synchronizers 150 and 160 in FIGS. 4 and 5. Also, each 2-stage synchronizer may be replaced with a synchronizer having 3, 4 or more stages.

Once the architecture of input clock synchronizer 50 has been determined, the operation time thereof is computed. The term "operation time" refers to the time from when the window enables the input clock synchronizer 50 until closing of the latch. Under "worst case" operating conditions, the operation time will be a multiple Y of T1, where Y is a real number.

The time window generator 40 may now be designed. The time window generator is designed to be operative to provide a window signal whose rising edge is generated by a rising edge of F2, the window signal having a high level portion whose duration is X×T2 and a low level portion whose duration is Z×T2, where:

Z is an integer multiple of 0.5 which fulfills the condition that the sum of Z and X is a positive integer.

X is an integer multiple of 0.5 which fulfills the following condition: $X>(Y/F1+TD/1000)\times F2$ where:

F1 and F2 are expressed in MHz; and

TD=sum, expressed in nanoseconds, of the time from closing of the latch until stabilizing of the data entering sampler 80, plus the set-up time of sampler 80.

If a range of frequencies is defined for F1, rather than a single value, then T1, for the purpose of this computation, is selected to be the inverse of the "worst case" F1, i.e. the inverse of the minimum F1 within the range.

If a range of frequencies is defined for F2, rather than a single value, then X and Z are defined with reference to the maximum F2 within the range which is the "worst case" F2.

The time window generator 40 is also designed to be operative to transmit a sample enable signal to sampler 80 of FIG. 2 which will cause sampler 80 to sample on a rising edge of F2 occurring after closure of latch 70 and no later than the F2 rising edge which generates the next window signal rising edge. If the falling edge of the window is generated by a rising edge of F2, the sampler 80 preferably samples after latch closure and on that rising edge of F2. Otherwise, the sampler 80 preferably samples on a rising edge of F2 occurring while the window signal is at its low level.

Reference is now made to FIGS. 9A–9D which are electronic schematic diagrams of time window generator 40, for the following cases:

If X=Z=0.5, time window generator 40 is eliminated and the window signal received by input clock synchronizer 50 is the F2 signal arriving from bus 20.

Figure 9A:
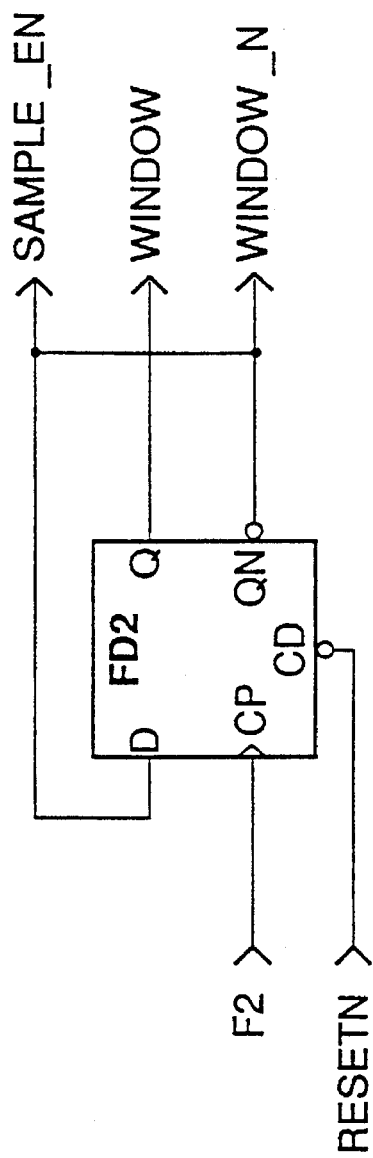
FIGS. 9A–9D are electronic schematic diagrams of time window generator 40, for four different high and low level portion durations.
Figure 9B:
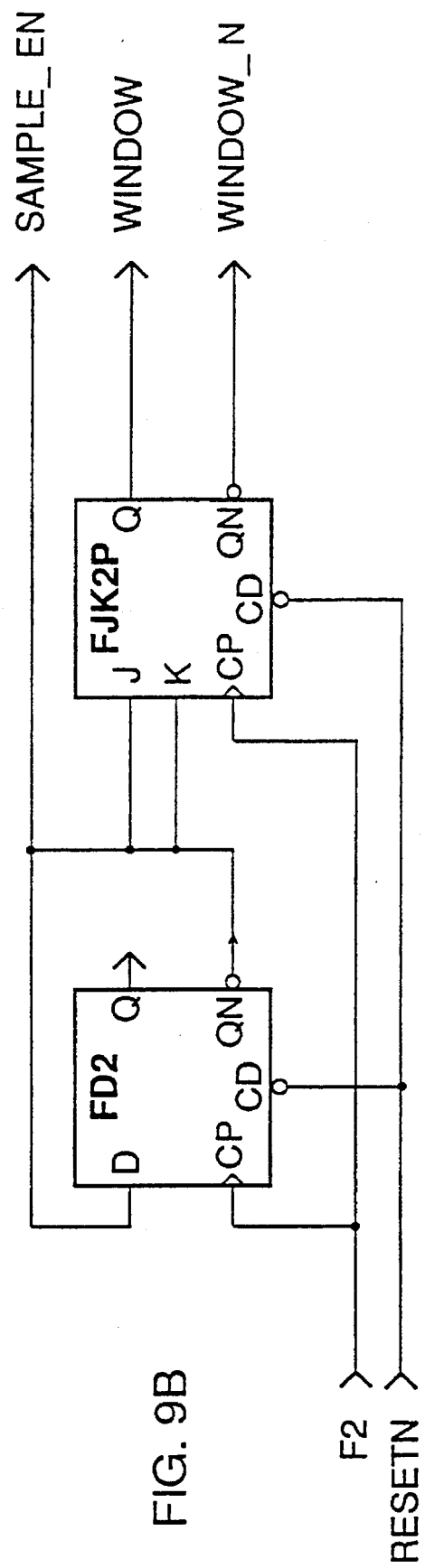
Figure 9C:
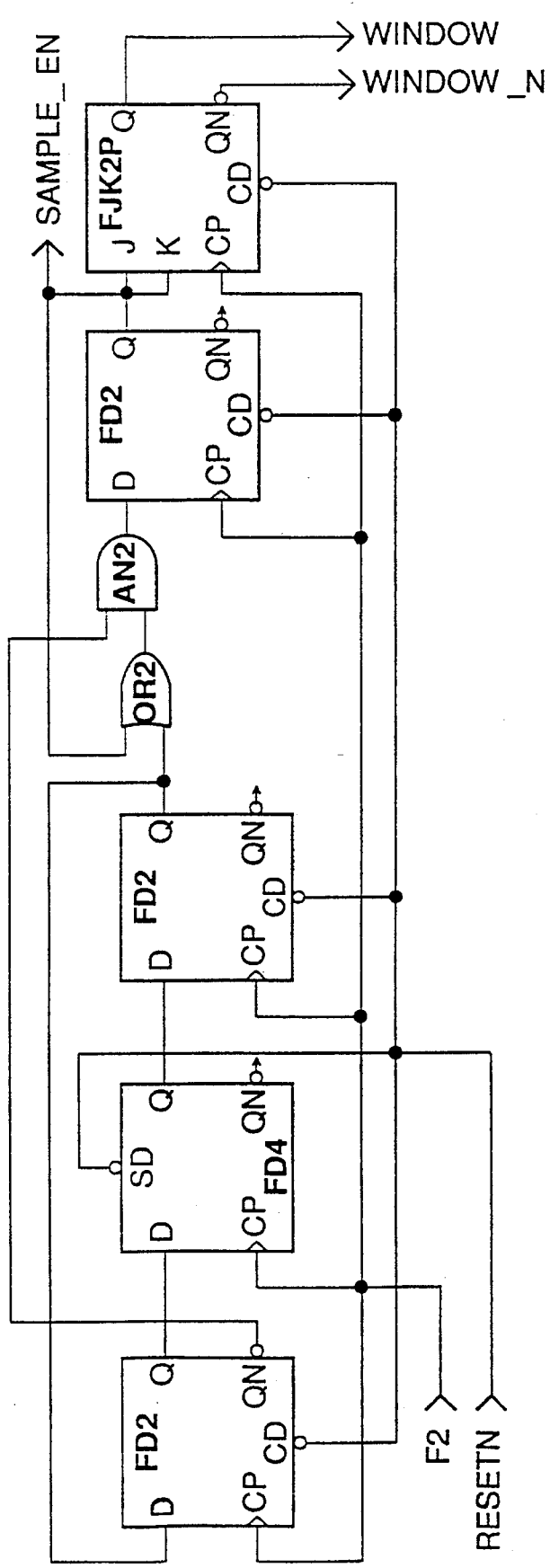
Figure 9D:
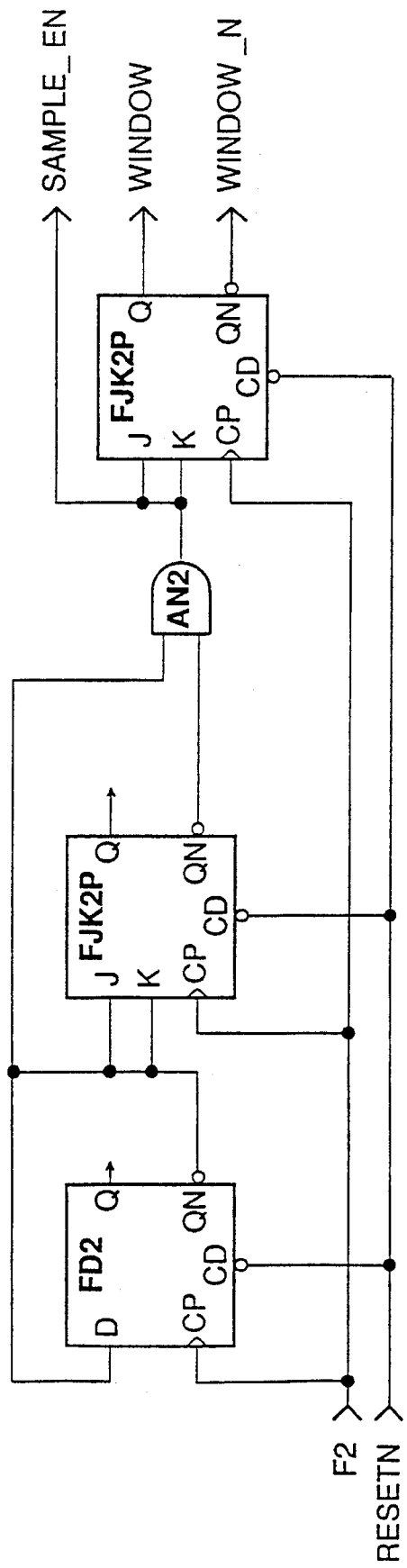
Figure 9E:
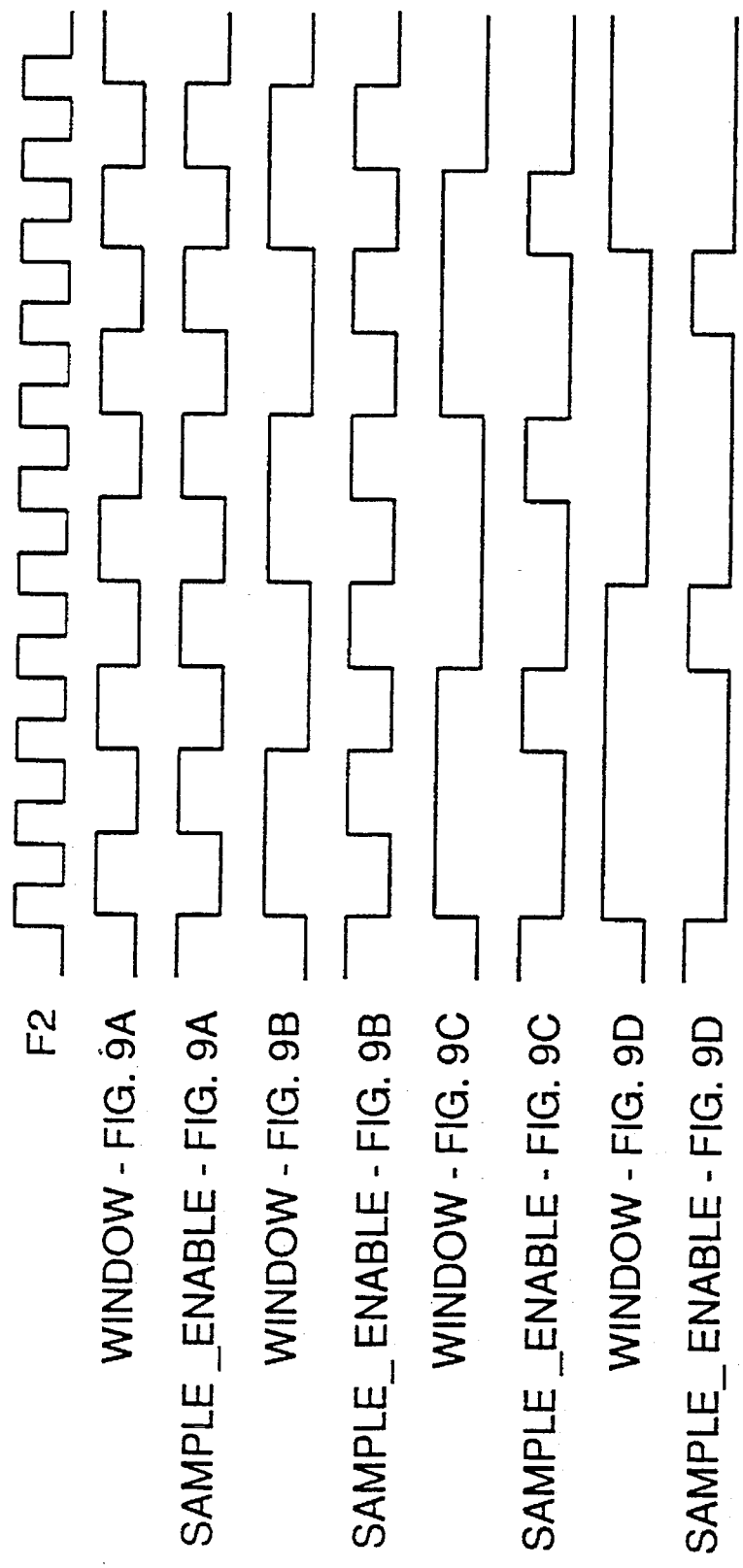
FIG. 9E is a timing diagram of the window and sample enable outputs of each of the time window generators of FIGS. 9A–9D.

FIG. 9E is a timing diagram of the window and sample enable outputs of each of the time window generators of FIGS. 9A–9D.

The bus latch and sampler 60 may now be designed. First, the question of whether or not to provide W delay units 64 is resolved. To do this, the arrival time of the plurality of bits arriving from bus 10 is compared to the arrival time of the falling edge in the latch enable signal which corresponds to that plurality of bits.

If the falling edge of the latch enable signal arrives after the first of the plurality of bits corresponding to the falling edge has entered an unstable state and before the last of the plurality of bits corresponding to the falling edge has entered a stable state, a delay unit 64 is provided. If the falling edge of the latch enable signal arrives after the last of the plurality of bits corresponding to the falling edge has entered a stable state, or before the first of the plurality of bits corresponding to the falling edge has entered an unstable state, delay unit 64 may be omitted.

Latch 70 may comprise any conventional latch which, in the illustrated embodiment, closes on the falling edge of its gate, such as the LD1 in LSI-LOGIC's ASIC library.

Figure 10:
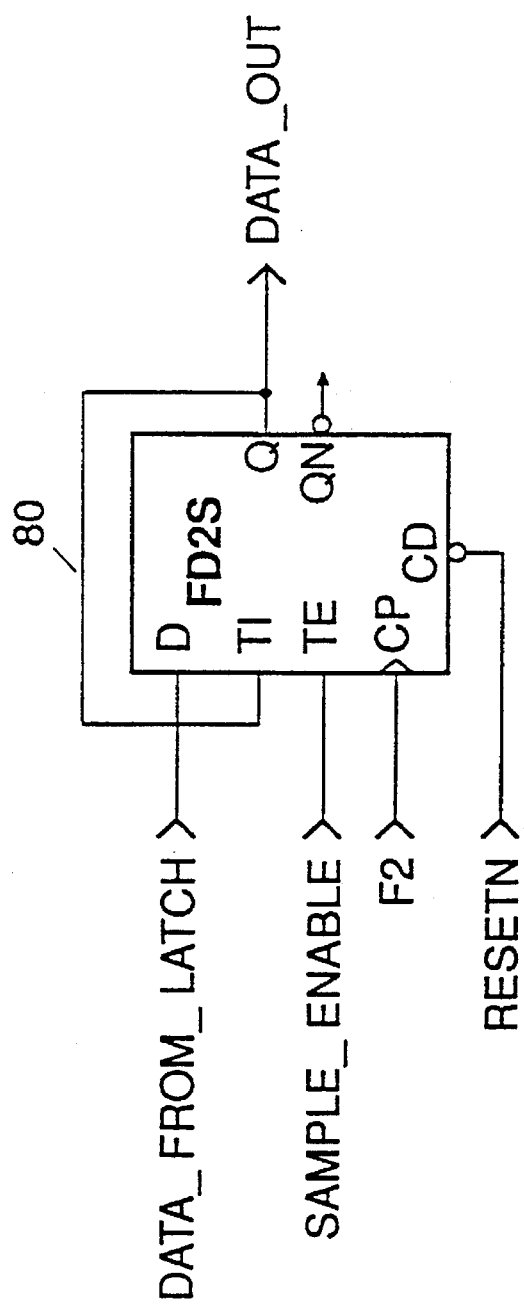
FIG. 10 is a detailed schematic illustration of a simple sampler 80, comprising a scan flip-flop.

A sample implementation of a sampler 80, comprising a scan flip-flop, is illustrated in FIG. 10.

Figure 11:
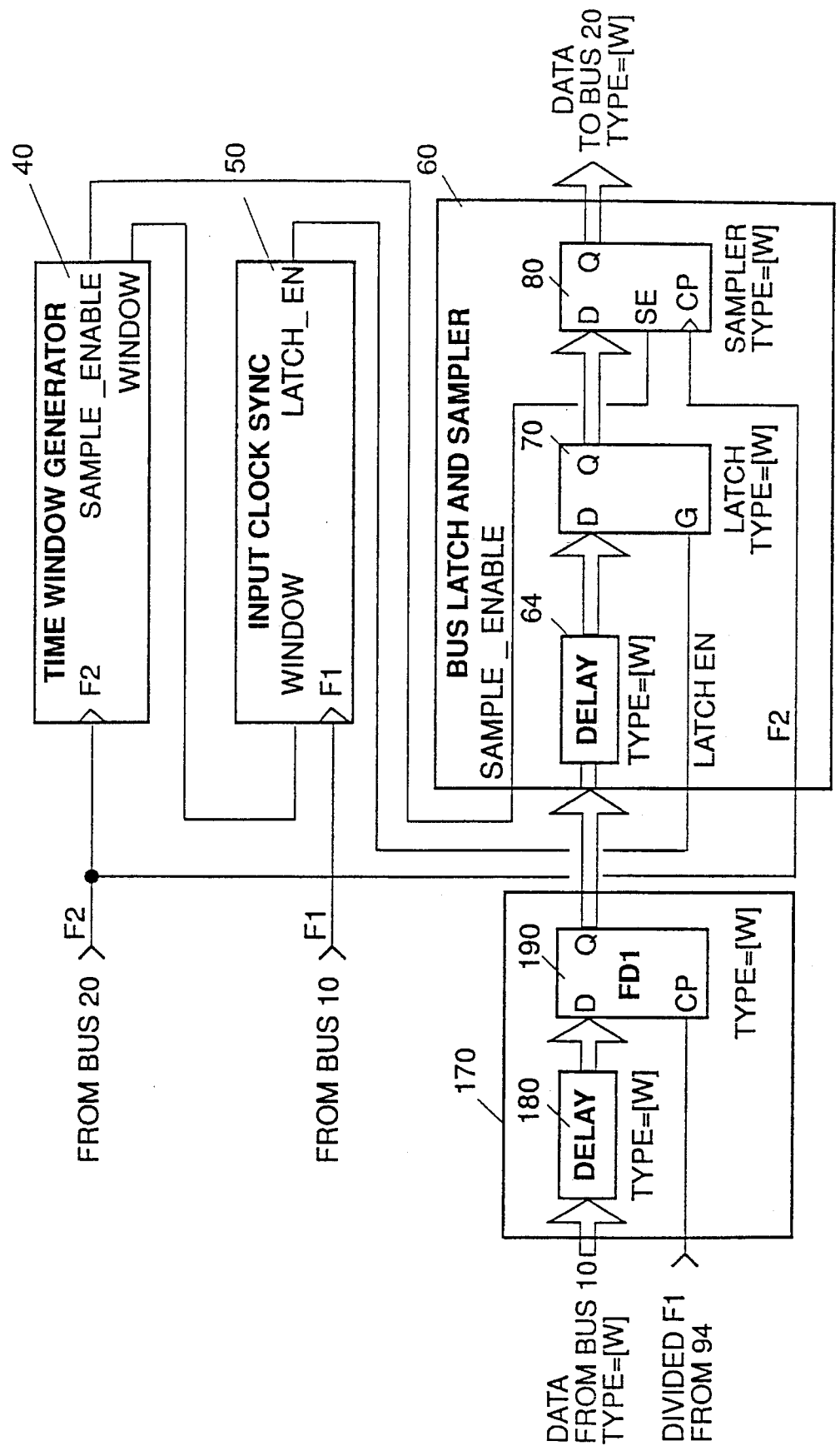
FIG. 11 is a simplified block diagram of the synchronizer of FIG. 1, constructed and operative according to an alternative embodiment of the present invention.

Reference is now made to FIG. 11 which is a simplified block diagram of synchronizer 30 of FIG. 1, constructed and operative according to an alternative embodiment of the present invention. The apparatus of FIG. 11 is useful when F1, the input frequency, is high such that input clock synchronizer 50 includes a divider 94 which divides clock F1 by a relatively large n. When this occurs, if the apparatus of FIG. 2 is employed, it may not be possible to provide a delay 64 which will succeed in delaying the data arriving from bus 10 long enough to ensure that the latch 70 samples valid data throughout the temperature range of the apparatus. In such applications, the apparatus of FIG. 11 may be employed.

The apparatus of FIG. 11 is generally similar to the apparatus of FIG. 2 except that a plurality of additional sampling units 170 are provided, corresponding in number to the width W of the bus 20, as indicated by the notation "TYPE=[W]". Each sampling unit 170 includes a delay 180, optionally, as well as a flip-flop 190. Each sampling unit 170 samples the data arriving from bus 10 according to the divided clock generated by divider 94 in input clock synchronizer 50, in contrast to FIG. 2 in which the data is not sampled but rather arrives directly from bus 10 at the delay 64 or latch 70.

Figure 12:
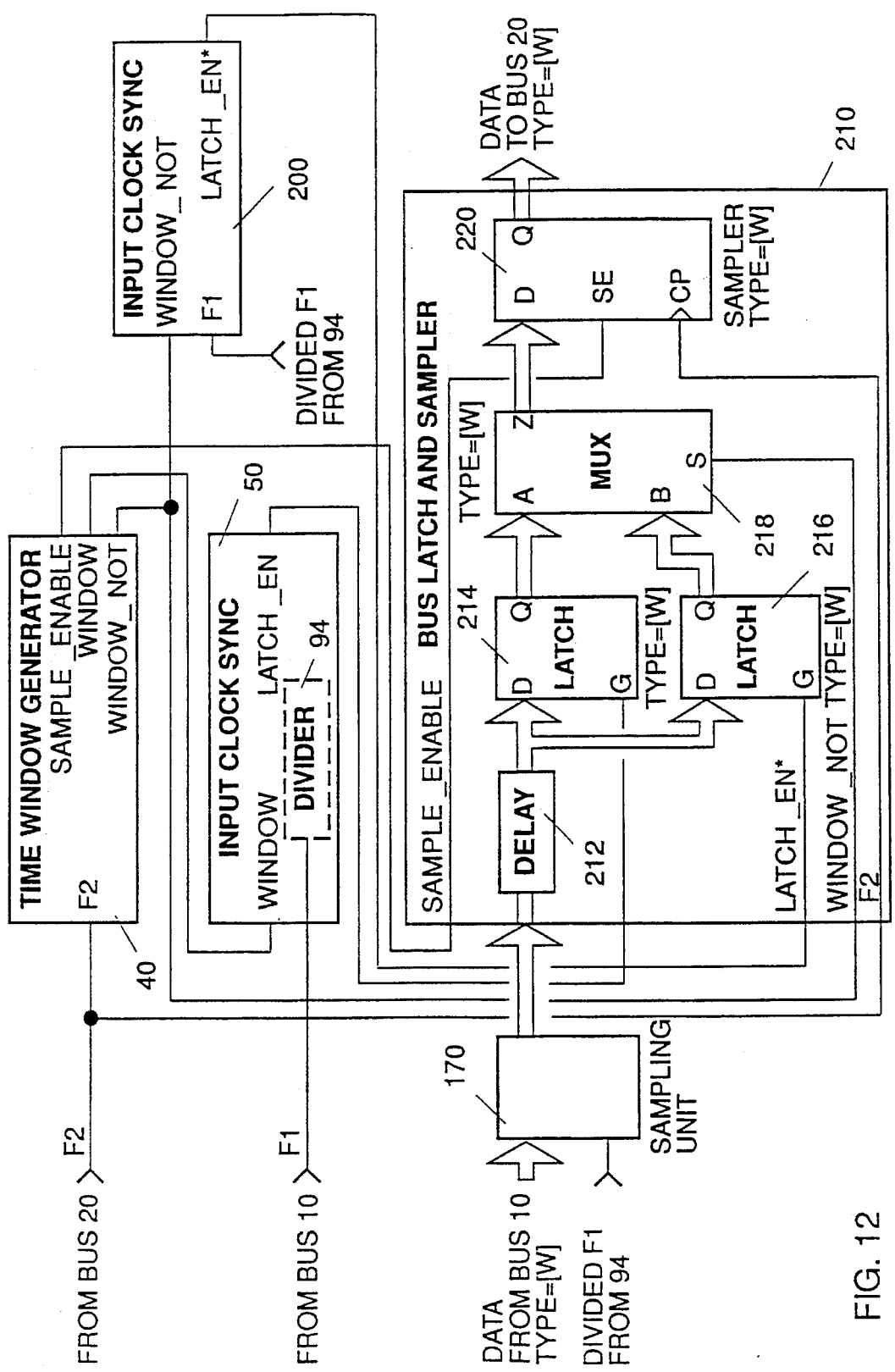
FIG. 12 is a simplified block diagram of the synchronizer of FIG. 1, constructed and operative according to a "double branched" embodiment of the present invention.

Reference is now made to FIG. 12 which is a simplified block diagram of synchronizer 30 of FIG. 1, constructed and operative according to an alternative, "double branched" embodiment of the present invention. The apparatus of FIG. 12 is useful when it is desired to double the synchronizing rate, in applications in which the window signal is symmetric, i.e. in which X=Z.

The apparatus of FIG. 12 is similar to the apparatus of FIG. 2 or, if optional sampling units 170 are provided, to the apparatus of FIG. 11, except for the following differences:

a. Time window generator 40 provides a "window not" signal in addition to the "window" signal, whose values are opposite to those of the window signal.

b. An additional input clock synchronizer unit 200 is provided. The additional input clock synchronizer unit 200 provides a "latch_enable*" signal. Additional input clock synchronizer unit 200 is similar to input clock synchronizer unit 50 except that:

(i) the additional unit operates according to the "window not" signal rather than according to the "window" signal; and (ii) The additional input clock synchronizer unit 200 does not include a divider 94 even if the input clock synchronizer unit 50 includes a divider. If unit 50 includes a divider 94, then unit 200 receives its clock from that divider.

c. Bus latch and sampler unit 60 of FIGS. 2 and 11 is replaced by double branch latch/sampler unit 210. Double latch/sampler unit 210 preferably includes the following elements, each duplicated W times such that the number of each element corresponds to the width W of bus 20:

(i) a delay unit 212 which may be similar to delay unit 64 of FIGS. 2 and 11;

(ii) a pair of latches 214 and 216, gated by the "latch_enable" signal generated by unit 50 and by the "latch_enable*" signal generated by unit 200, respectively. Each of the latches 214 and 216 may be similar to latch 70 of FIGS. 2 and 11;

(iii) a latch multiplexer 218 receiving input from latches 214 and 216 and operative, according to the "window_not" signal provided by time window generator 40, to pass the output of latch 214 when the "window_not" signal S is low and to pass the output of latch 216 when the "window_not" signal S is high; and (iv) a sampler 220 which may be similar to sampler 80 of FIG. 10 except that data arrives from latch multiplexer 218 rather than directly from latch 70.

Figure 13:
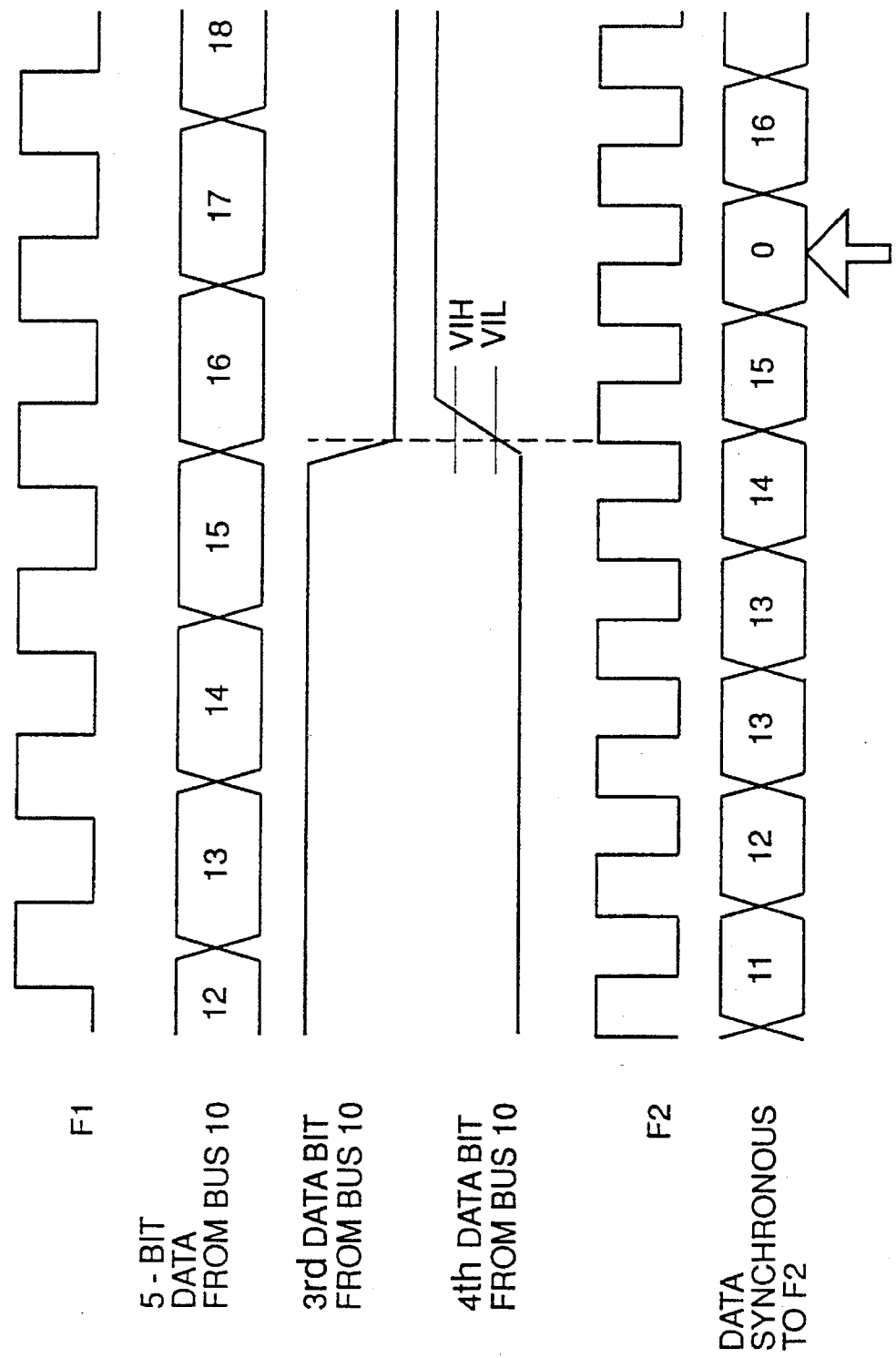
FIG. 13 is a theoretical timing diagram illustrating a sample malfunctioning of a hypothetical rising-edge triggered bus synchronizing device.

Reference is now made to FIG. 13 which is a theoretical timing diagram illustrating a sample malfunctioning of a hypothetical rising-edge triggered bus synchronizing device including a plurality of two-stage synchronizers, each including a pair of sequential flip-flops, the plurality of two-stage synchronizers corresponding in number to the width of bus 20, i.e. to the number of bits in bus 20.

The first line in FIG. 13 represents F1.

The second line in FIG. 13 represents 5-bit data arriving from bus 10. As shown, the arriving values are 12, 13, 14, 15, 16, 17 and 18. In binary representation, the arriving values are as follows:

| 4th bit | 3th bit | 2nd bit | 1st bit | 0th bit | |
|---------|---------|---------|---------|---------|------|
| 0 | 1 | 1 | 0 | 0 | = 12 |
| 0 | 1 | 1 | 0 | 1 | = 13 |
| 0 | 1 | 1 | 1 | 0 | = 14 |
| 0 | 1 | 1 | 1 | 1 | = 15 |
| 1 | 0 | 0 | 0 | 0 | = 16 |
| 1 | 0 | 0 | 0 | 1 | = 17 |
| 1 | 0 | 0 | 1 | 0 | = 18. |

The third line in FIG. 13 represents the third bit. As shown in the above table, the third bit is 1, or high, while the data arriving from bus 10 is 12, 13, 14 and 15. The third bit goes to 0, or low, when the data arriving from bus 10 goes to 16.

The fourth line in FIG. 13 represents the fourth bit. As shown above, the fourth bit is 0, or low, while the data arriving from bus 10 is 12, 13, 14 and 15. The fourth bit goes to 1, or high, when the data arriving from bus 10 goes to 16.

In the illustrated example, the fourth bit goes to 1 more slowly than the third bit goes to 0. This might occur due, for example, to different loading of the third and fourth data lines.

The fifth line in FIG. 13 represents F2. Since F2 is asynchronous to F1, which generates the first bus output, sampling for the second bus is asynchronous to the data being sampled. As shown, the sixth rising edge of F2, indicated by a vertical dotted line, samples the fourth bit when it is under the low level threshold, VIL. Therefore, the value sampled from the first bus will be 00000 rather than 10000, i.e. 0 rather than 16, as shown in the sixth line of FIG. 13.

Figure 14:
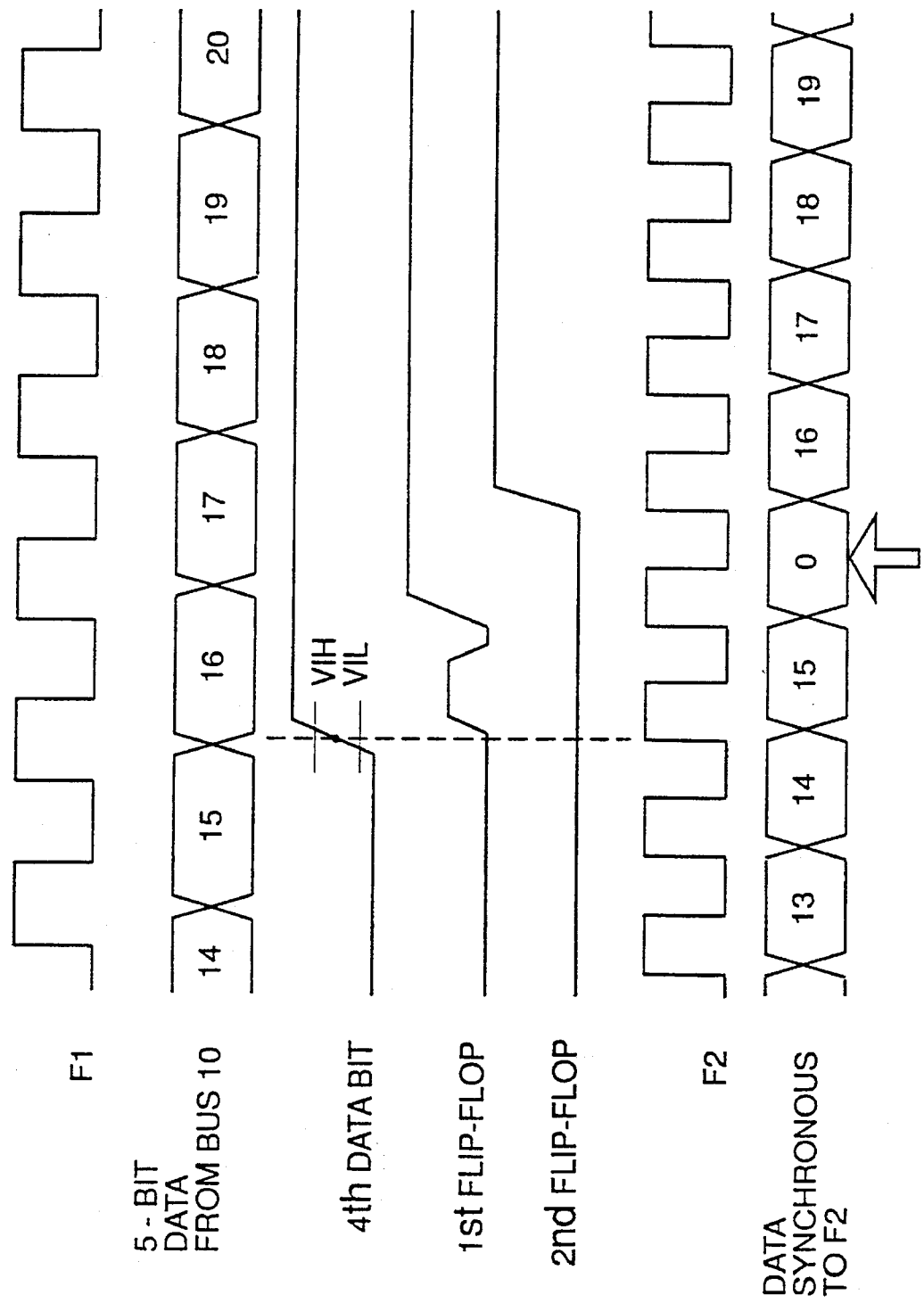
FIG. 14 is a theoretical timing diagram illustrating another example of malfunctioning of a hypothetical rising-edge triggered bus synchronizing device.

Reference is now made to FIG. 14 which is a theoretical timing diagram illustrating another example of malfunctioning of a hypothetical rising-edge triggered bus synchronizing device including a plurality of two-stage synchronizers, each including a pair of sequential flip-flops, the plurality of two-stage synchronizers corresponding in number to the width of bus 20, i.e. to the number of bits in bus 20.

The first line in FIG. 14 represents F1. The second line in FIG. 14 represents 5-bit data arriving from bus 10. As shown, the arriving values are 14, 15, 17, 18, 19 and 20. In binary representation, the arriving values are as follows:

| 4th bit | 3th bit | 2nd bit | 1st bit | 0th bit | |
|---|---|---|---|---|---|
| 0 | 1 | 1 | 1 | 0 | = 14 |
| 0 | 1 | 1 | 1 | 1 | = 15 |
| 1 | 0 | 0 | 0 | 0 | = 16 |
| 1 | 0 | 0 | 0 | 1 | = 17 |
| 1 | 0 | 0 | 1 | 0 | = 18 |
| 1 | 0 | 0 | 1 | 1 | = 19 |
| 1 | 0 | 1 | 0 | 0 | = 20. |

The third line in FIG. 13 represents the fourth bit of the bus 10 data. As shown above, the fourth bit is 0, or low, while the data arriving from bus 10 is 14 and 15. The fourth bit goes to 1, or high, when the data arriving from bus 10 goes to 16.

The fourth line in FIG. 13 represents the fourth bit of the output of the first of the pair of sequential flip-flops. As shown, the first flip-flop samples the fourth bit of the bus 10 data at a point in time, indicated by a vertical dotted line, at which the fourth bit of the bus 10 data falls between the low and high level thresholds VIL and VIH. Therefore, the fourth bit of the first flip-flop enters a metastable state and only subsequently stabilizes to 0. The fifth line in FIG. 13 represents the fourth bit of the output of the second of the pair of sequential flip-flops. The fourth bit of the output of the second flip-flop samples the fourth bit of the output of the first flip-flop. The second flip-flop does not sample the first flip-flop while the fourth bit thereof is in a metastable state, and therefore, the second flip-flop does not enter a metastable state. However, the end result, as shown in the seventh line, is that a 0 is sampled between the 15 and the 16 because the fourth bit entered a metastable state before rising to 1, instead of directly rising to 1.

Two examples of synchronizers constructed and operative in accordance with a preferred embodiment of the present invention are now described. Both examples are suitable for a second bus 20 with 6 bits.

Example A

Figure 15:
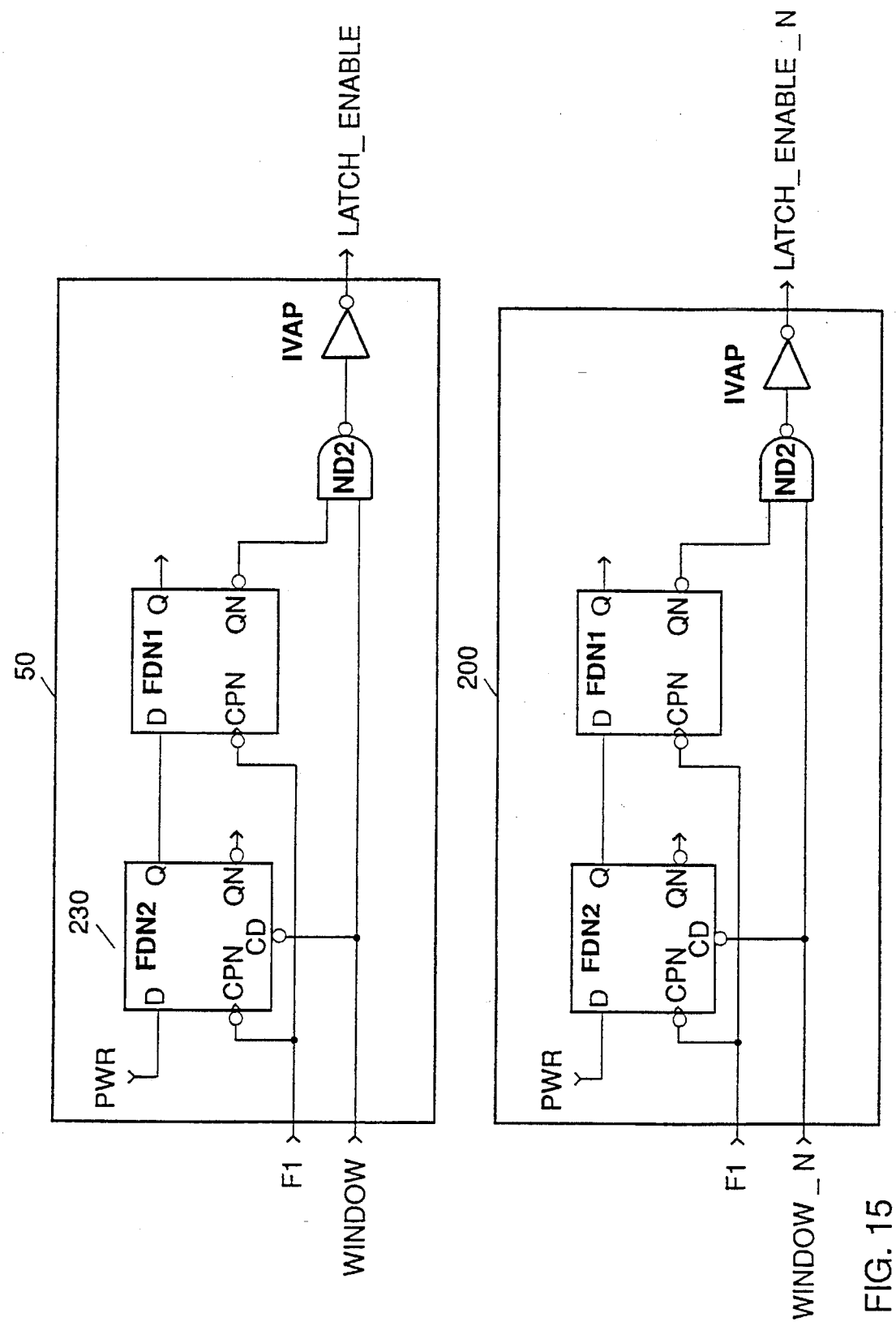
FIG. 15 is a detailed schematic drawing of a pair of input clock synchronizers constructed and operative in accordance with a preferred embodiment of the present invention.

A synchronizer suitable for a range of frequencies of 12–33 MHz for F1 and 8–10 MHz for F2. The synchronizer is constructed in accordance with the embodiment of FIG. 12. Time window generator 40 of FIG. 12 is constructed in accordance with the embodiment of FIG. 9B. Input clock synchronizers 50 and 200 are as illustrated in FIG. 15 and bus latch/sampler unit 60 is as illustrated in FIG. 16.

Figure 17:
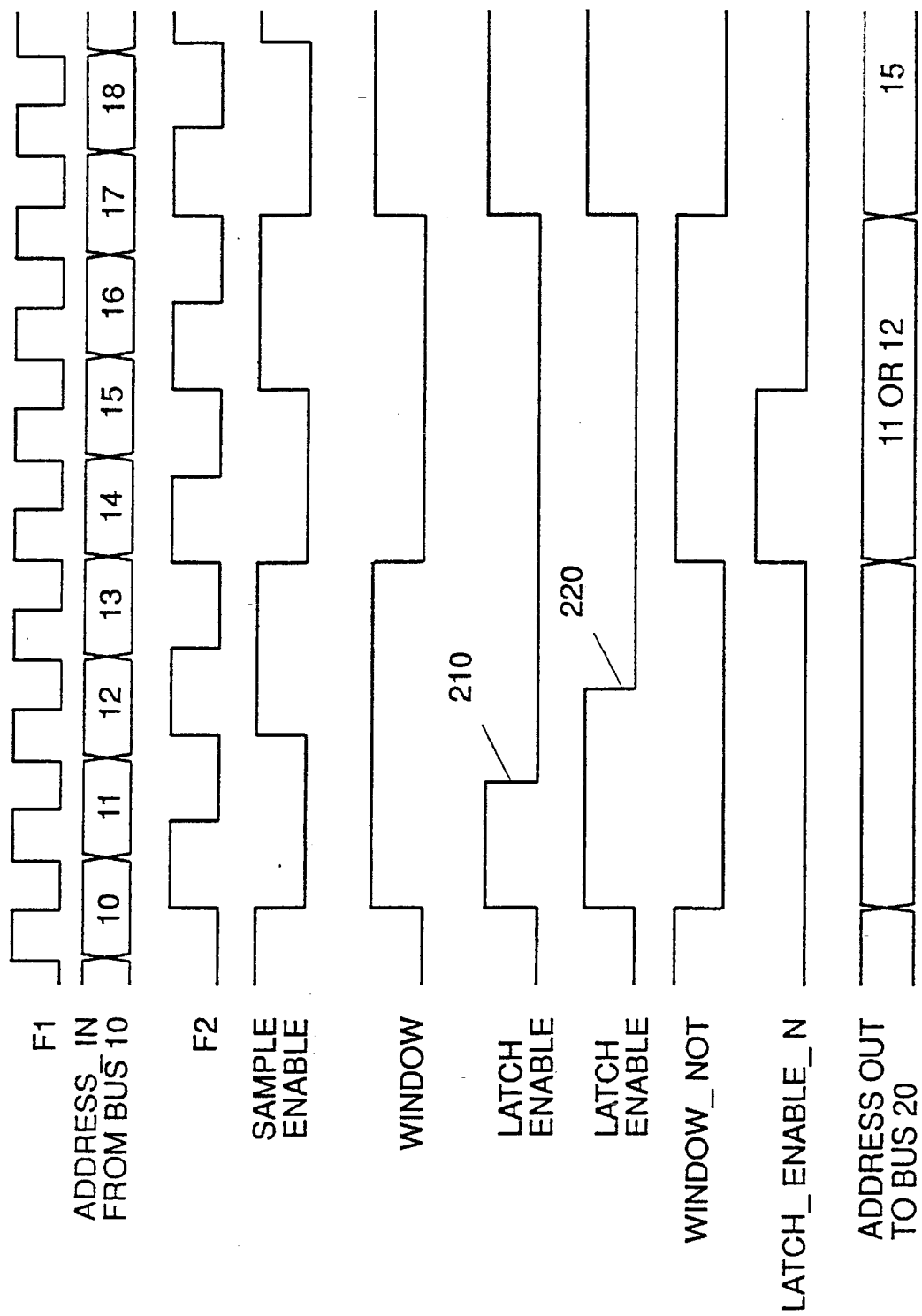
FIG. 17 is a timing diagram for a synchronizer, constructed and operative in accordance with a preferred embodiment of the present invention, which is suitable for a range of frequencies of 12–33 MHz for F1 and 8–10 MHz for F2.

FIG. 17 is a timing diagram for the synchronizer of Example A. As shown, the window signal generated by time window generator 40 of Example A is F2, divided by 4.

Figure 16:
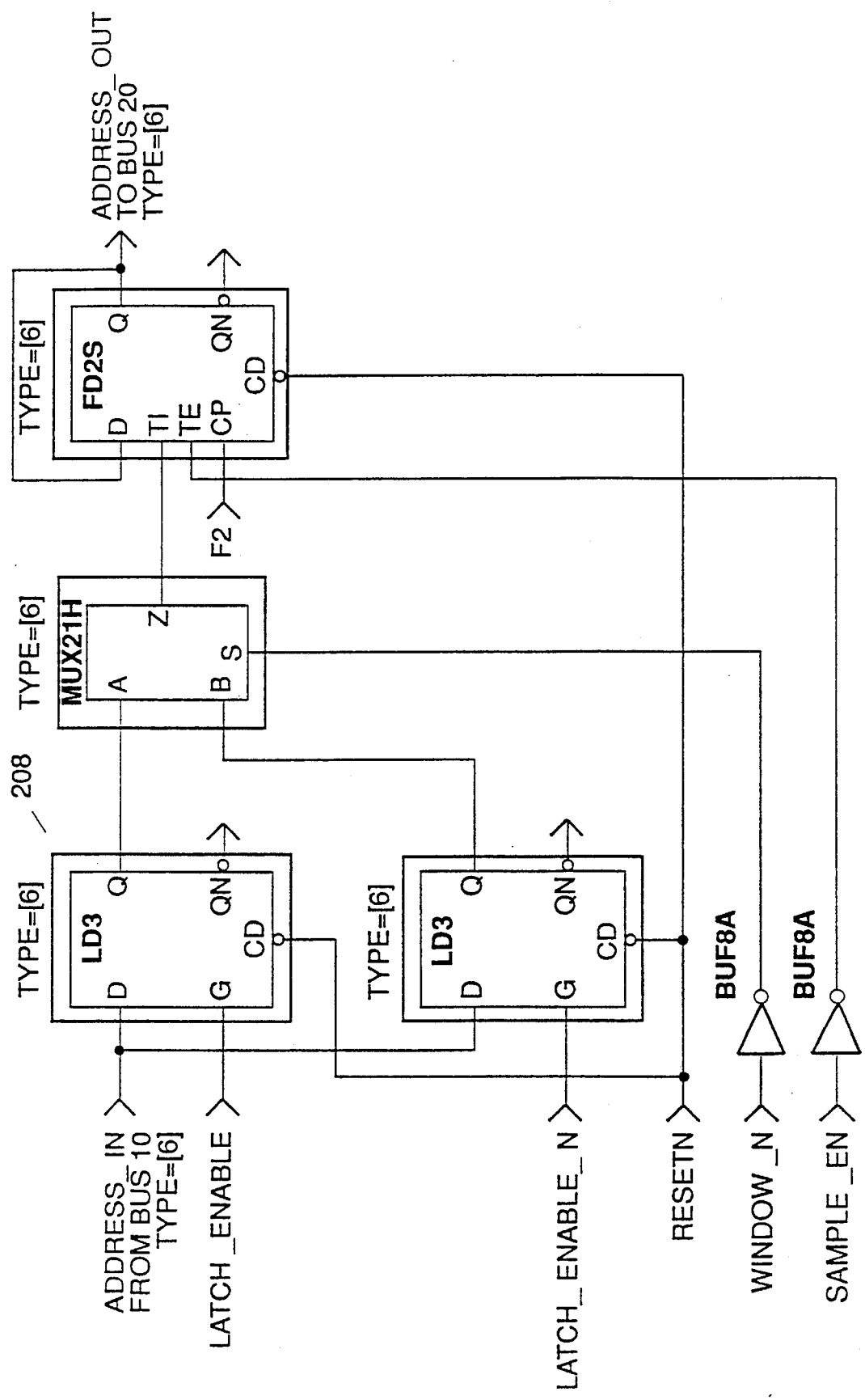
FIG. 16 is a detailed schematic drawing of a bus latch/sampler unit constructed and operative in accordance with a preferred embodiment of the present invention.

As illustrated in lines 6 and 7 of FIG. 17, the latch enable signal may close the latch 208 of FIG. 16 at two different times, as indicated by arrows 210 and 220 of FIG. 17. The closing time indicated by arrow 210 in line 6 of FIG. 17 occurs when flip-flop 230 of FIG. 15 does not enter metastability or when flip-flop 230 enters metastability and subsequently settles to value 1. The closing time indicated by arrow 220 in line 7 of FIG. 17 occurs when flip-flop 230 of FIG. 16 enters metastability and settles on value 0, causing a delay in operation. Either of these two times is satisfactory because both of these times close the latch 208 within the high level portion of the window signal.

Example B

A synchronizer suitable for applications in which F1 is approximately 40 MHz and F2 is approximately 8.33 MHz.

Figure 18:
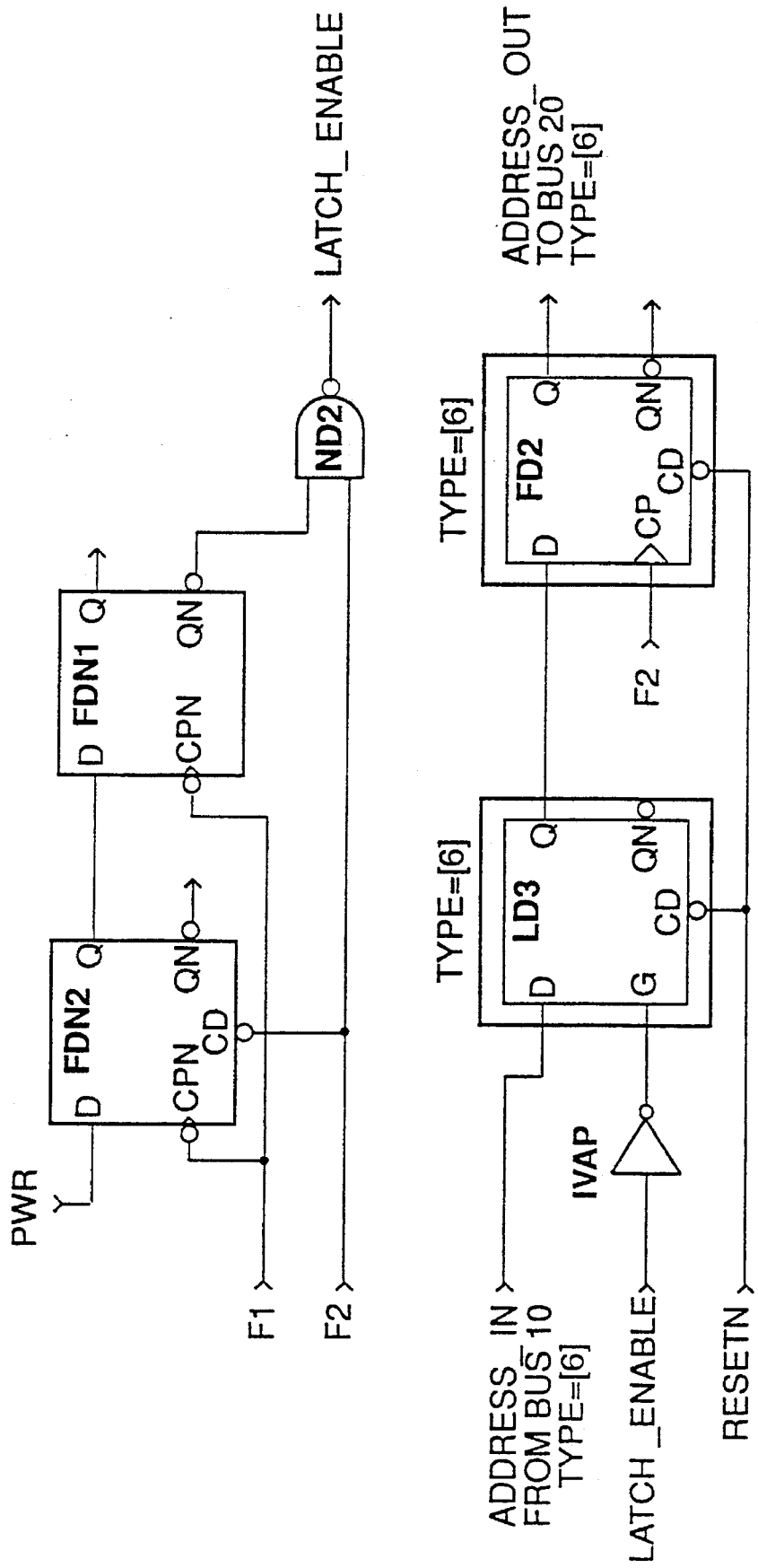
FIG. 18 is a detailed schematic illustration of a synchronizer constructed and operative in accordance with a preferred embodiment of the present invention which is suitable for applications in which F1 is approximately 40 MHz and F2 is approximately 8.33 MHz.

A detailed schematic drawing of the synchronizer of Example B is provided in FIG. 18.

Figure 19:
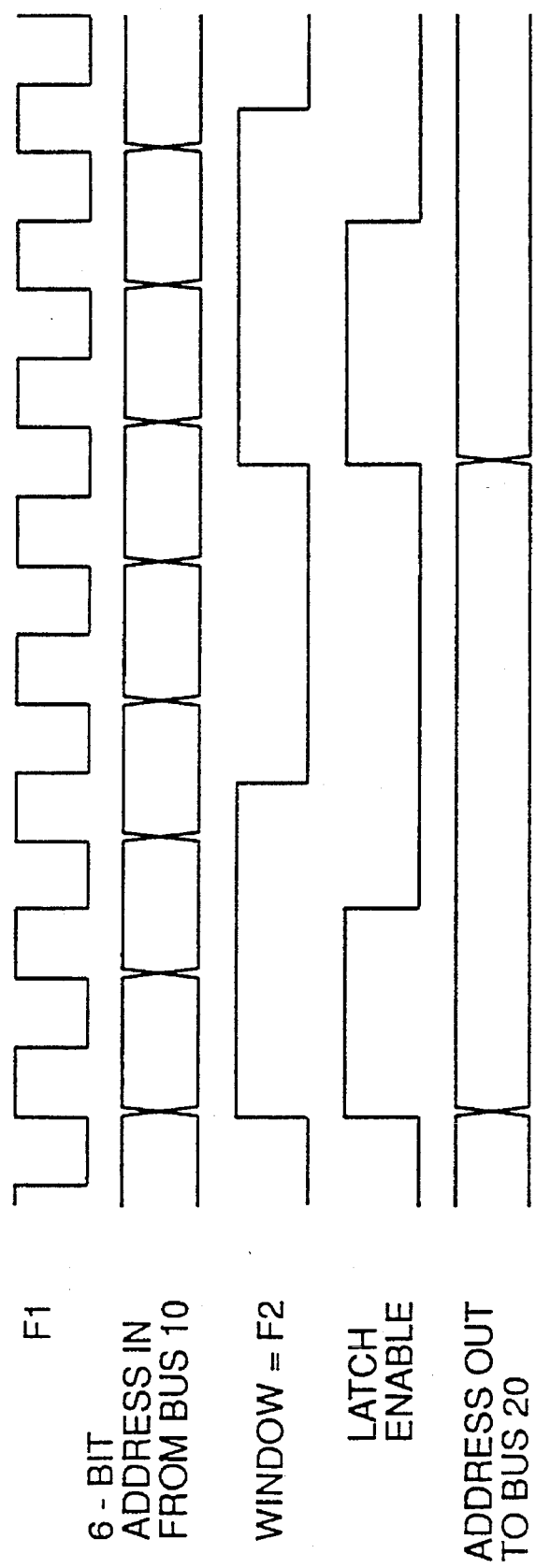
FIG. 19 is a timing diagram for the apparatus of FIG. 18.

The timing diagram of the apparatus of FIG. 18 is provided in FIG. 19.

In the specification, unless otherwise stated, frequency variables are typically measured in MHz and cycle times in nanoseconds.

It is appreciated that the particular embodiment described in the Examples is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately.

It will be appreciated by persons skilled in the art that the present invention is not limited to what has been particularly shown and described hereinabove. Rather, the scope of the present invention is defined only by the claims that follow:

I claim:

1. Apparatus for data communication from a first data bus having a first clock frequency to a second data bus having a second clock frequency, asynchronous to said first clock frequency, said apparatus comprising:

a synchronizer operative to sample data on said first data bus at a selected sampling rate and to provide such data to said second data bus at said selected sampling rate, a time window generator operative to define a time window for sampling at least one signal of said first data bus and receiving a signal defining a clock input from said second data bus;

at least one input clock synchronizer receiving a window defining output from the time window generator and a signal defining a clock input from said first data bus and providing a latch enable signal;

a bus latch and sampler operative to receive a data input from said first data bus and said signal defining a clock input from said second data bus and being operative to sample said data input from said first data bus in response to receipt of said latch enable signal, said bus latch and sampler being operative to provide the sampled data input from said first data bus to said second data bus at a time determined by said signal defining a clock input from said second data bus.

2. Apparatus according to claim 1 and wherein said synchronizer is operative to provide such data to said second data bus without a handshake.

3. Apparatus according to claim 1 and wherein said data comprises memory addresses.

4. Apparatus according to claim 1 and wherein said second data bus is operative to accept said data provided by said synchronizer at said second clock frequency.

5. Apparatus according to claim 1 and wherein said bus latch and sampler comprises at least one single stage memory for storing the sampled data input.

6. Apparatus according to claim 5 and wherein said at least one single stage memory comprises:

at least one latch array receiving said data input from said first data bus and said latch enable signal and being operative to sample said data input in response to said latch enable signal and at a time determined thereby; and a sampler receiving the sampled data input, sampled by the latch array and being operative to output said data to said second data bus at a time determined by said second clock signal and by the window defining output.

7. Apparatus according to claim 6 and wherein said sampler is operative to output said data at a time following sampling by the latch array within a given window.

8. Apparatus according to claim 7 wherein said sampler comprises an array of flip-flops corresponding in number to the width of the narrower of the two busses.

9. Apparatus according to claim 6 wherein said latch array comprises a plurality of latches corresponding in number to the width of the narrower of the two busses.

10. Apparatus according to claim 6 wherein said at least one input clock synchronizer comprises two input clock synchronizers and said at least one latch array comprises two latch arrays and also comprising a multiplexer for selecting from among the two latches, the latch which most recently sampled the first bus.

11. Apparatus for data communication from a first data bus having a first clock frequency to a second data bus having a second clock frequency, asynchronous to said first clock frequency, said apparatus comprising:

a synchronizer operative to sample data on said first data bus at a selected sampling rate and to provide such data to said second data bus at said selected sampling rate, at least one input clock synchronizer receiving a clock input from said first data bus and providing a latch enable signal;

a bus latch and sampler operative to receive a data input from said first data bus and a clock input from said second data bus and being operative to sample said data input from said first data bus in response to receipt of said latch enable signal, said bus latch and sampler being operative to provide the sampled data input from said first data bus to said second data bus at a time determined by said clock input from said second data bus.

12. Apparatus according to claim 11 and wherein said bus latch and sampler is operative to sample said data input from said first data bus and to provide an output thereof to said second data bus twice during said time determined by said clock input from said second data bus.

* * * * *